United States Patent [19]

Forney et al.

[11] 4,116,586
[45] Sep. 26, 1978

[54] CONSTANT FLUID LEVEL CONTROL FOR MACHINE RESERVOIR

[75] Inventors: Richard Davidson Forney, Cincinnati; Richard Samuel Hernandez, Milford; Richard Anderson Curless, Cincinnati, all of Ohio

[73] Assignee: Cincinnati Milacron Inc., Cincinnati, Ohio

[21] Appl. No.: 794,724

[22] Filed: May 9, 1977

[51] Int. Cl.[2] .............................................. F04B 49/00
[52] U.S. Cl. ................................ 417/41; 137/101.27; 137/413
[58] Field of Search .............. 137/122, 101.25, 101.27, 137/413; 417/41

[56] References Cited

U.S. PATENT DOCUMENTS 3,930,423  1/1976  Craig .................................. 137/413 X

*Primary Examiner*—William R. Cline
*Attorney, Agent, or Firm*—Thomas M. Farrell

[57] ABSTRACT

A housing contains a slidable spool operable to port a first pressurized fluid line to a fluid motor, and a housing reservoir has a float movable with a fluid level. The motor drives a pump which "pumps down" the reservoir. A second pressurized fluid line is directed through a primary fixed orifice and against one end of the spool, acting against a spring bias, and is permitted to exit through an end orifice to the reservoir. The float moves in response to the fluid level and operates to shut off the end orifice flow, thereby building up backpressure to shift the spool, and thus varying outlet flow from the valve in accordance with the reservoir level. Therefore, the reservoir is pumped down in accordance with reservoir build-up.

1 Claim, 2 Drawing Figures

CONSTANT FLUID LEVEL CONTROL FOR MACHINE RESERVOIR

BACKGROUND OF THE INVENTION

In machine tools and other similar equipment, it is frequently necessary to use hydraulically-powered elements such as cylinders, hydraulic motors, hydraulic clutch assemblies and the like, and, as many such elements are contained with a machine housing, leakage and design drainage are often channeled to a common reservoir. In order to relieve the fluid build-up, a gravity drain line is often provided between the housing and a hydraulic tank assembly.

In some assemblies, however, it is impractical or impossible to provide a gravity drain system. For example, the size of a drain line may have to be considerably large to properly drain high volumes solely under the influence of gravity. Further, it may be impossible to provide a gravity drain where the exit line must travel uphill to a head above the reservoir level, as is frequently encountered in vertically movable machine assemblies wherein the fluid lines are often looped to accommodate vertical movement. In this latter type of assembly, a scavenger pump is frequently employed to get the drain oils back to the hydraulic tank.

Several prior art assemblies has been designed to scavenge a vertically movable assembly, and most generally employ a float which moves with the fluid level. However, it must be realized that the bouyant force on a relatively small float may not be significant, and is often not directly usable to move a mechanical element. Therefore, assemblies which must move mechanical elements by float means frequently may employ a force magnifying linkage to shift a spool and actuate some sort of switch which in turn, activates a motor and pump assembly. The float switch, well-known in the art, serves to close electrical contacts and power an electrical motor which in turn drives a hydraulic pump. The electrical motors in the range of one horse power or so, are quite bulky and heavy, and are cumbersome to fit into a design. Further, the electrical motor/hydraulic pump arrangement is binary in nature; that is, the pump runs at one speed for a predetermined amount of time and then shuts off, possibly causing the pump to run dry. The additional necessary electrical elements, such as relay logic in a magnetic panel, contribute to the expense of the system.

The prior art assembly falls short of solving the ideal condition, that is, attempting to match exit flow rate from the reservoir to varying inlet flow rates to the reservoir, with a relatively small, compact group of parts.

Applicant has obviated the difficulties inherent in the prior art assembly by a scavenger pump which is controlled by a fluid control valve assembly and powered solely by a hydraulic motor. The system has variable pumping rates in accordance with varying fluid levels of the reservoir, attempting to match the two.

It is therefore an object of the present invention to provide a scavenger pump assembly which tends to substantially match reservoir inlet and exit flow rates.

Another object of the present invention is to provide a fluid control valve for controlling a scavenger pump assembly having a relatively simple non-linkage float system having a design which can generally fit into a space less than that of an equivalent linkage-type design.

SUMMARY OF THE INVENTION

The invention is shown embodied in a fluid control valve for powering a scavenger pump, wherein a reservoir has a fluid level which varies in accordance with drain rates and the like from a machine assembly. A float is movable with the fluid level and a housing contains a slidable spool, adapted to port a pressurized fluid line to a hydraulic motor, and the motor is coupled to a fluid pump to pump down the reservoir level accordingly. A second pressurized fluid line is applied through a primary fixed orifice to one end of the spool, reacting against a biasing spring, and is directed through a secondary pressure-dropping orifice to the reservoir. The float is operable to restrict the flow from the secondary orifice, thereby building upstream pressure to shift the spool against the biasing spring and thus vary outlet flow from the valve in accordance with the reservoir level.

DESCRIPTION OF THE PREFERRED EMBODIMENT

Figure 1:
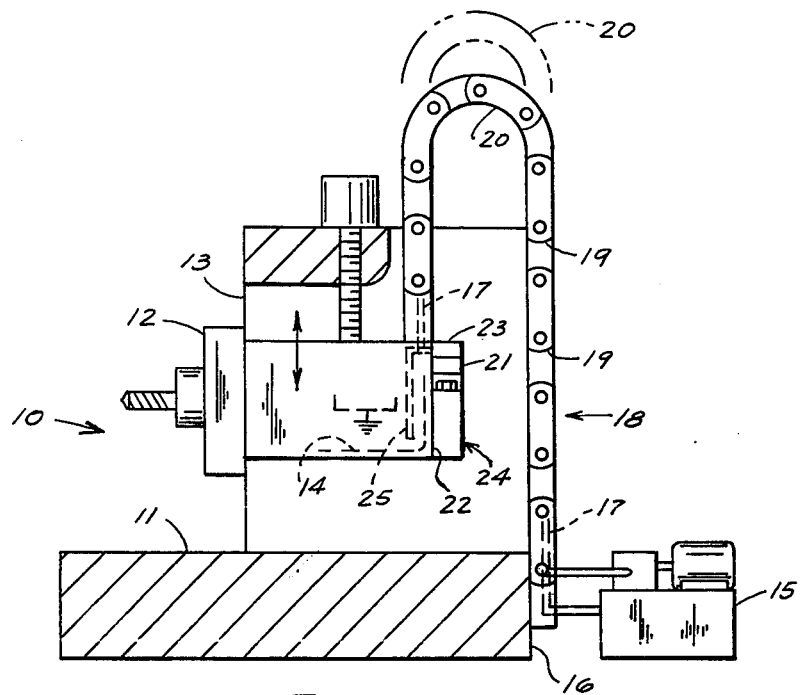
FIG. 1 is a section through a machine tool having a vertically movable fluid reservoir and a vertical fluid discharge path.

The elevational section taken through the machine tool 10 of FIG. 1, shows a machine base 11 adapted for carrying a movable machine assembly 12 along a vertical way 13 on the machine base 11. The machine assembly 12 has an internal fluid reservoir 14, for receiving leakage and drainage from internal machine components (not shown). A hydraulic pump and tank unit 15 is shown at the rear 16 of the machine proximate to the machine base 11, and hydraulic lines are communicated from the pump and tank unit 15 to the machine assembly 12 by hose assemblies 17 which are guided through a vertical track 18 of linkable elements 19 well-known in the art, and the track 18 runs up the rear 16 of the machine base 11 and is bent through an overhead loop 20 to run down to the machine assembly 12. In this manner, as the machine assembly 12 moves in a vertical fashion, the linkable track 18 will remain in the same attitude, but the loop 20 will travel in accordance with assembly movement. A hydraulic motor 21 is shown on the rear wall 22 of the machine assembly 12 and is mechanically coupled to a hydraulic pump 23. The motor 21 and pump 23 are relatively small packages employing GEROTOR elements, well-known in the art. The motor 21 is powered by pressure coming from a fluid control valve 24 also attached to the rear wall 22 of the machine assembly.

The fluid control valve 24 ports a variable volume of high pressure oil to the hydraulic motor 21 and drives the pump 23, which has a suction line 25 extending into the fluid of the machine reservoir 14. The exit from the pump 23 is directed up through the linkable track 18 and back to the pump and tank unit 15 through hoses 17.

Figure 2:
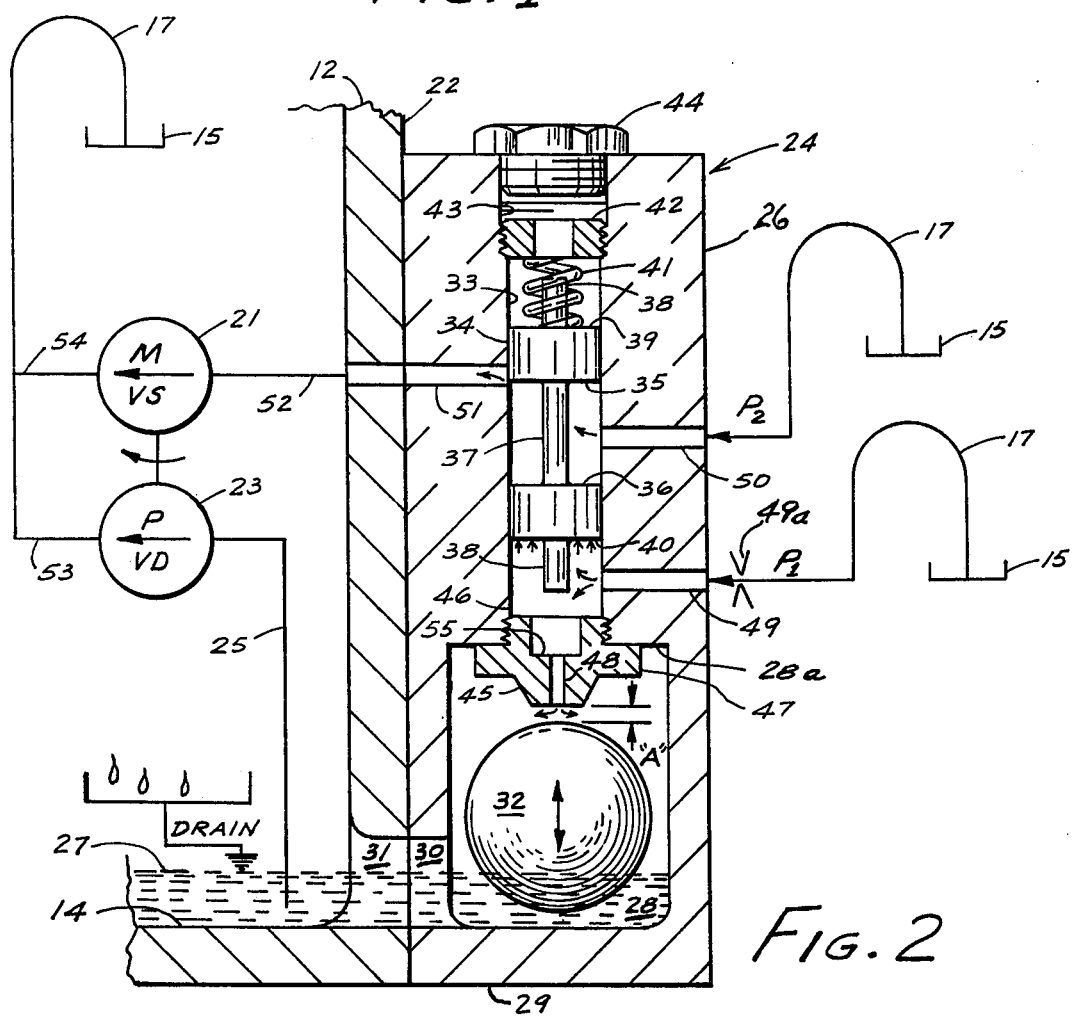
FIG. 2 is an elevational section through a fluid control valve for powering a scavenger pump assembly.

FIG. 2 is an elevational section through the fluid control valve 24 of FIG. 1, and the valve 24 comprises, in part, a housing 26 which is attached to the rear wall 22 of the movable machine assembly 12, and the machine reservoir 14 has a fluid level 27 which is permitted to enter a reservoir cavity 28 in the bottom 29 of the valve housing 26, through openings 30,31 in the housing 26 and the rear wall 22 of the machine assembly 12, so that, for all intents and purposes, the reservoir cavity 28 and the machine reservoir 14 become one unit. A ball-type float 32 is contained within the reservoir cavity 28 and permitted to move in a vertical mode in accordance with the fluid level 27. A spool bore 33 is provided through the housing 26 directly above the ball float 32, and a slidable spool 34 is received in the bore 33. The spool 34 has two lands 35,36 connected by a reduced central portion 37. A stem portion 38 is provided at the top and bottom ends 39,40 of the spool 34 for symmetry in assembling, and the stem portion 38 functions primarily as a guide for a helical compression spring 41 provided at the top end 39 of the spool to bias it downwardly. The biasing spring 41 is loaded by a set screw 42 threadably received in the upper end 43 of the bore 33, and a cap plug 44 is also threadably received in the bore 33 as a seal. An orifice cap 45 is threadably received in the lower end 46 of the bore 33, wherein the cap 45 has a shoulder portion 47 which bears against the topmost surface 28a of the reservoir cavity 28. The orifice cap 45 has an orifice 48 extending centrally therethrough, thus providing communication between the lower end 46 of the bore 33 and the reservoir 14. A first fluid inlet line 49 is interdrilled through the valve housing 26 and into the bore 33 between the lower end 40 of the spool 34 and the orifice cap 45. An in-line primary fixed orifice 49a is located at the mouth of the inlet line 49. A relatively low pressure $P_1$ comes from the hydraulic pump and tank unit 15 through a looped hose assembly 17 as previously described and is directed through the primary orifice 49a. A second fluid inlet line 50 having a relatively high pressure, $P_2$, is interdrilled through the valve housing 26 and into the bore 33 between the two lands 35,36 of the spool 34. Pressure $P_2$ likewise comes from the hydraulic unit 15 through a looped hose assembly 17. A fluid outlet line 51 is interdrilled in the valve housing 26 and connected to the bore 33 so as to be opened and closed by the upper land 35 of the valve spool 34, permitting pressurized fluid from the second inlet line 50 to exit and directly communicate with the hydraulic motor 21 by means of a motor inlet line 52. The motor 21 is shown diagrammatically and is mechanically coupled to the variable delivery pump 23 operable in accordance with the variable motor speed. The pump 23 has its suction line 25 connected to the fluid reservoir 14 and its pressurized outlet line 53 routed directly back to the hydraulic pump and tank unit 15 by means of a looped hose assembly 17. The motor outlet line 54 is connected to the pump outlet line 53 for convenience.

In operation, drainage from internal machine components (not shown) enters the reservoir 14, tending to raise the fluid level 27 and ball float 32. Hydraulic pressure $P_1$ enters the lower end 46 of the bore 33 through the primary fixed orifice 49a and exits through the secondary orifice 48, thus contributing to the fluid level 27. The pressure drop experienced through the secondary orifice 48 varies in accordance with the flow rate from it. A reduction of dimension "A" by a rising ball float 32 subsequently reduces the flow rate from the secondary orifice 48, causing a pressure build-up on the upstream side 55 of the orifice 48, and, this pressure build-up on the lower end 40 of the spool 34, overcomes the biasing force of the spring 41 and shifts the spool 34 in an upward direction. As the spool 34 is shifted to a point where the upper land 35 of the spool 34 uncovers the fluid outlet line 51, the flow of fluid from the second inlet line 50 will begin rotating the hydraulic motor 21 at an RPM corresponding to the flow rate. Thereafter, as the fluid level 27 may continue to rise, closing down dimension "A" still additionally, the spool 34 will be shifted still further, causing increased flow rate to the hydraulic motor 21 and increased pumping speed of the pump 23 and consequent "pump down" of the reservoir.

In actual practice, the biasing spring 41 is set for an expected fluid level 27, and the upper spool land 35 will tend to "hunt" for an equilibrium level at the fluid outlet line 51 which seeks to match the motor speed and pump output rate to the incoming drain rates of the reservoir 14.

What is claimed is:
1. A constant fluid level control for machine reservoir, comprising in combination:
 (a) a housing affixed to a machine carrier;
 (b) a carrier reservoir maintaining a fluid level;
 (c) a float in said reservoir movable in response to said fluid level;
 (d) a bore in said housing;
 (e) a spool slidably received in said bore;
 (f) an orifice communicating with said bore on an upstream side and with said reservoir on a downstream side;
 (g) a first fluid inlet line in said housing connected through pressure-dropping means to said bore between said upstream side of said orifice and an end of said spool;
 (h) a second fluid inlet line in said housing connected to said bore between a pair of spool lands;
 (i) a fluid motor mounted to said machine carrier;
 (j) a fluid outlet line in said housing connected at one end to said bore for communication with said second fluid inlet line as said spool is shifted and connected at the other end to said fluid motor to influence speed control of said motor; and
 (k) a fluid pump drivingly connected to said fluid motor and having the pump inlet in fluid communication with the fluid of said reservoir;
 whereby said float is operable in response to said fluid level to directly restrict flow from said orifice, changing upstream pressure to shift said spool, thus varying said outlet line flow and motor speed in accordance with said fluid level, tending to match fluid level rise with reservoir pump down rate.

* * * * *